INVENTOR.
WERNER STRITTMATTER

United States Patent Office 3,323,843
Patented June 6, 1967

3,323,843
MOUNTING FOR WIPER BLADES IN THIN LAYER EVAPORATORS
Werner Strittmatter, Butzbach, Hesse, Germany, assignor to Farbenfabriken Bayer Aktiengesellschaft, Leverkusen, Germany, a German corporation
Filed Oct. 1, 1963, Ser. No. 313,103
Claims priority, application Germany, Oct. 10, 1962, F 22,792
3 Claims. (Cl. 308—22)

This invention relates to a mounting arrangement for wiper blades, such as are used for stirring fluid and wiping the inner wall of a thin layer type evaporator or similar vessel.

Essentially, the invention provides a wiper blade mounting arrangement in which one or more wiper blades are supported between a pair of blade carriers which in turn are mounted on a rotatable drive shaft. The whole arrangement is ordinarily placed within the evaporator or other vessel and positioned therein such that when the shaft rotates, the wiper blades are carried around an orbital path and their outer edges wipe against the inner wall of the vessel. In addition to this wiping action, the wiper blades, by reason of their movement relative to the vessel induce a stirring circulation of whatever liquid or gaseous fluid is contained in the vessel and lies in their path of movement.

To avoid the necessity of high precision fitting, the wiper blades are pivotally supported by the blade carriers so that under the influence of centrifugal force, their outer edges are urged into wiping contact with the vessel wall, which is preferably cylindrical and coaxial with the shaft rotation axis. For this purpose, each wiper blade has a pair of oppositely projecting spindles coaxially aligned with each other, and which are received in corresponding aligned bores provided on each blade carrier.

Each blade carrier includes a ring member supported in surrounding relation to the shaft and generally concentric therewith. These ring members are supported expediently by radial spokes connected to a collar mounted on the shaft, and are arranged in axially spaced-apart relation to each other. Hence, the blade carriers are generally disposed in axially spaced-apart relation to each other, and in radially extended relation to the shaft axis.

For each wiper blade carried, there is provided on one ring member a simple bore disposed to receive one of the wiper blade spindles. On the other ring member, there is provided an open threaded bore extending therethrough and a slot extending transversely into the bore to accommodate the insertion of the other wiper blade spindle therethrough into the bore opening. A threaded stud member, having an open bore at the end thereof is screwed into the threaded bore so as to receive the spindle within its bore. This allows each wiper blade to be simply and conveniently removed and replaced. All that is necessary to remove a wiper blade is to unscrew the stud until the spindle is released from its bore, and then said spindle can be slipped out of the ring member through the slot as the other spindle is lifted out of the bore provided in the other ring member.

It is therefore, an object of the invention to provide a wiper blade mounting arrangement suitable for use in wiping the walls of an evaporator or other vessel.

Another object of the invention is to provide a wiper blade mounting arrangement as aforesaid wherein the wiper blades can be quickly and easily removed and replaced.

A further object of the invention is to provide a wiper blade mounting arrangement as aforesaid wherein the wiper blades are pivoted by centrifugal forces into wiping contact engagement with the vessel wall.

Other and further objects and advantages of the invention will become apparent from the following detailed description and the drawing, in which.

Figure 1:
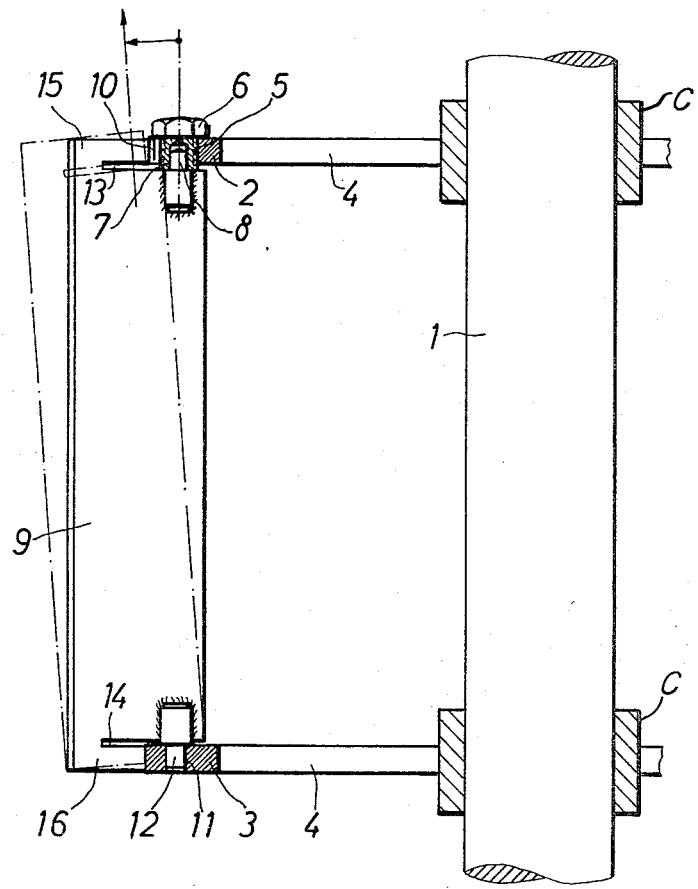
FIG. 1 is a longitudinal view, partly in section, of a wiper blade mounting arrangement according to a preferred embodiment of the invention.
Figure 2:
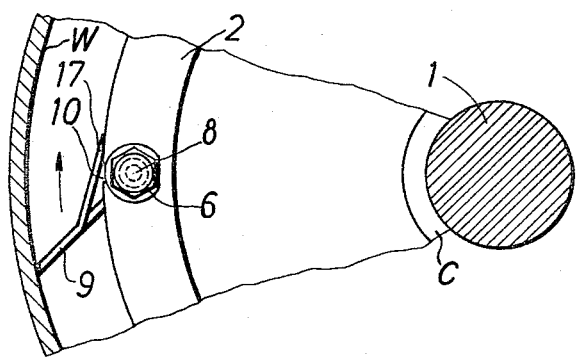
FIG. 2 is an axial view, partly in section, of a typical portion of the wiper blade mounting arrangement shown in FIG. 1, together with a typical vessel wall section to be wiped by the wiper blades.

As exemplified in FIGS. 1 and 2, the wiper blade mounting arrangement features a drive shaft 1 disposed for rotation about its longitudinal axis and relative to the vessel inside wall surface W. A pair of rings 2 and 3, together with associated radial support spokes or arms 4 and shaft mounting collars C define a respective pair of blade carriers which function to carry one or more wiper blades 9 in an orbital path as the shaft 1 rotates. Each wiper blade 9 is supported by and between rings 2 and 3 on its oppositely projecting spindles 8 and 12 which allow the blade 9 to execute pivotal movement relative to said rings 2 and 3 as it travels therewith. Thus, as can be better appreciated from FIG. 2, when the shaft 1 rotates in the direction of the arrow, centrifugal forces acting on the blade 9 swing it outwardly about the pivot axis defined by spindles 8 and 12, until the outer edge of said blade 9 wipes against the wall W.

The ring 2 contains a threaded bore 5 for each wiper blade 9, and a threaded stud 6 is screwed into the bore 5. The threaded stud 6 is provide with a bore 7 into which the pivot spindle 8 of the wiper blade 9 is received. At the edge of the ring 2 there is a slot 10 which extends as far as the threaded bore 5 and the width of which is slightly greater than the diameter of the pivot spindle 8. The lower ring 3 is provided for each wiper blade with a bore 11 into which the spindle 12 of the wiper blade is fitted. To fit the wiper blade 9 in position, the spindle 12 is inserted in the bore 11 of the lower ring, with the wiper blade in the oblique position (dotted lines), and the upper spindle 8 is then pushed through the slot 10 of the ring 2 as far as the threaded bore 5, and the stud 6 is then screwed into the bore 5 from above, the spindle 8 then extending into the bore 7. The ends of the wiper blade 9, which carry the pivot spindles 8 and 12, are provided with slots (13, 14) and are bent over to form flaps 15, 16. The bevelled edges 17 of the flaps 15 and 16 bear against the outer edges of the rings 2 and 3 and thus serve to support the wiper blade when the shaft 1 is rotated in the direction of the arrow. When the stud 6 has been loosened, the wiper blade can be swung out of the slot and removed from the bore of the lower supporting ring.

If desired, this mounting stud may, of course, also be arranged on the lower supporting ring 3 and the ordinary bore 7 can then be arranged in the upper ring 2.

I claim:
1. A wiper blade mounting arrangement which comprises a shaft disposed for rotation about its longitudinal axis, at least one wiper blade having a pair of fixedly positioned oppositely projecting support spindles coaxially aligned with each other, a pair of blade carriers mounted on said shaft for rotation therewith, said blade carriers being disposed in a radially extended relation to said shaft axis and axially spaced apart from each other by a distance equal to the end-to-end spacing of said wiper blade spindles minus a distance approximately equal to the sum of the projection lengths of said spindles, said blade carriers having, for each wiper blade, a pair of coaxially aligned bores, one bore in each blade carrier, one of said bores being disposed to receive one spindle of said wiper blade to pivotally support same, said spindle and bore being substantially equal in diameter, and the other of said bores being threaded and larger in diameter than the opposite spindle of said wiper blade, and extended through its associated blade carrier, said blade carrier bearing the threaded bore having a transversely extending slot communicating therewith, said slot being of a width and depth to accommodate the insertion therethrough of said opposite spindle into said threaded bore, and for each wiper blade, a threaded stud member having an internal bore open at the end thereof and disposed for extension into said threaded blade carrier bore in threaded engagement therewith to position said internal bore to receive said opposite spindle to pivotally support same and said wiper blade for movement with said blade carriers in an orbital path about said shaft axis, and for pivotal movement relative to said blade carriers about an axis defined by said coaxial bores and wiper blade spindles.

2. The wiper blade mounting arrangement according to claim 1 wherein the pivot axis of each wiper blade is parallel to said shaft rotation axis.

3. The wiper blade mounting arrangement according to claim 2 wherein each wiper blade has a bent flap portion disposed for engagement with a blade carrier to limit the pivotal movement of the wiper blade relative thereto.

References Cited

UNITED STATES PATENTS

| | | | |
|---|---|---|---|
| 1,870,993 | 8/1930 | Gardner | 308—18 X |
| 2,470,691 | 5/1949 | Erickson et al. | 259—134 |
| 2,974,725 | 3/1961 | Samesreuther et al. | |
| 3,216,042 | 11/1965 | Strittmatter. | |

FOREIGN PATENTS 25,530   11/1908   Great Britain.

MARTIN P. SCHWADRON, *Primary Examiner.*

DAVID J. WILLIAMOWSKY, EDGAR W. GEOGHEGAN, *Examiners.*

N. ABRAMS, R. HESS, *Assistant Examiners.*